(12) United States Patent
Green

(10) Patent No.: US 8,596,612 B1
(45) Date of Patent: Dec. 3, 2013

(54) BOBBYJACK

(71) Applicant: Bob J. Green, Lake Charles, LA (US)

(72) Inventor: Bob J. Green, Lake Charles, LA (US)

( * ) Notice: Subject to any disclaimer, the term of this patent is extended or adjusted under 35 U.S.C. 154(b) by 0 days.

(21) Appl. No.: 13/916,333

(22) Filed: Jun. 12, 2013

Related U.S. Application Data

(60) Provisional application No. 61/659,170, filed on Jun. 13, 2012.

(51) Int. Cl.
*B66F 3/24* (2006.01)
*B66F 5/02* (2006.01)
*B66F 3/00* (2006.01)

(52) U.S. Cl.
USPC ........ 254/93 R; 254/29; 254/133 R; 254/134; 254/10 B

(58) Field of Classification Search
USPC .............. 254/2 B, 133 R, 134, 10 B; 269/17; 29/255, 244, 281.1, 243.56, 261
See application file for complete search history.

(56) References Cited

U.S. PATENT DOCUMENTS

| | | | |
|---|---|---|---|
| 2,617,678 A | 11/1952 | Kelso | |
| 3,207,326 A | 9/1965 | Enix | |
| 3,451,711 A | 6/1969 | Carpenter | |
| 3,561,615 A | 2/1971 | Forsberg | |
| 4,218,044 A | 8/1980 | Ikhsanov | |
| 4,284,385 A | 8/1981 | Lively | |
| 5,048,793 A | 9/1991 | Mefford | |
| 6,349,869 B1 * | 2/2002 | McBee | 228/49.3 |
| 6,352,390 B1 * | 3/2002 | Jones | 405/230 |
| 7,165,915 B2 * | 1/2007 | Queen | 405/244 |
| 7,195,426 B2 * | 3/2007 | May | 405/230 |
| 8,029,036 B2 | 10/2011 | Kline | |
| 8,434,801 B2 | 5/2013 | LeBlanc | |
| 2010/0001241 A1 * | 1/2010 | Rentschler | 254/2 R |

* cited by examiner

*Primary Examiner* — Monica Carter
*Assistant Examiner* — Seahee Yoon
(74) *Attorney, Agent, or Firm* — Greg R. Mier

(57) ABSTRACT

An apparatus for lifting pipes in a pipe rack for the purpose of inspecting the point of contact with the supporting beam, and to remedy any damage caused by corrosion and wear and tear.

20 Claims, 20 Drawing Sheets

BOBBYJACK

CROSS REFERENCE TO RELATED APPLICATIONS

The present application claims priority from provisional patent application No. 61/659,170, filed on Jun. 13, 2012.

FIELD OF THE INVENTION

The subject invention relates to devices for lifting pipe.

BACKGROUND

In a typical chemical processing plant or oil refinery, literally miles of horizontal pipe lines of various sizes are supported in pipe racks on structural steel beams. The same is true for power plants, food processing facilities, and many other industries.

A common problem in piping systems of this type is corrosion of the pipe at the point of contact with the supporting beam. Moisture and corrosive products trapped at this interface can be the cause of severe damage and, ultimately, leaks which may be harmful to personnel or the environment and, depending on the product conveyed in the pipe, can result in major property loss due to a fire or explosion.

In a well maintained facility, considerable effort is expended to prevent the types of problems just described. One effective strategy is to periodically lift the pipe line at each supporting beam and inspect for damage. If minor damage is detected, a typical remedy is to sandblast the corroded area and then to apply a protective coating. More extensive mechanical repair may be required if the wear or corrosion is severe.

To accomplish this kind of inspection and repair, the pipe line must be lifted by approximately six inches at each pipe-to-beam interface and temporarily suspended in that position while the work is performed. A crane and heavy equipment operator are usually employed to lift the pipe lines and this can be very costly. Alternatively, chain falls or other rigging equipment can be used on lower levels of a pipe rack to raise the pipe but these can be costly due to manpower and scaffolding requirements.

The present invention will replace conventional pipe lifting equipment and will result in enhanced safety and significantly lower manpower costs.

BRIEF DESCRIPTION OF THE DRAWINGS

The accompanying drawings are provided for the purpose of illustration only and are not intended as a definition of the limits of the present invention. The drawings illustrate a preferred embodiment of the present invention, wherein.

DESCRIPTION OF THE INVENTION

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention.

Referring to FIGS. 1-20, operation of the present invention is described in the following paragraphs.

Before using the present invention, the user should position a work platform (scaffold or manlift) approximately five feet to six feet below a pipe 5 (FIGS. 1 & 9) to be lifted. The user should make certain that the area below the platform is kept clear of personnel.

Next, place the individual parts of the present invention on the platform.

Figure 1:
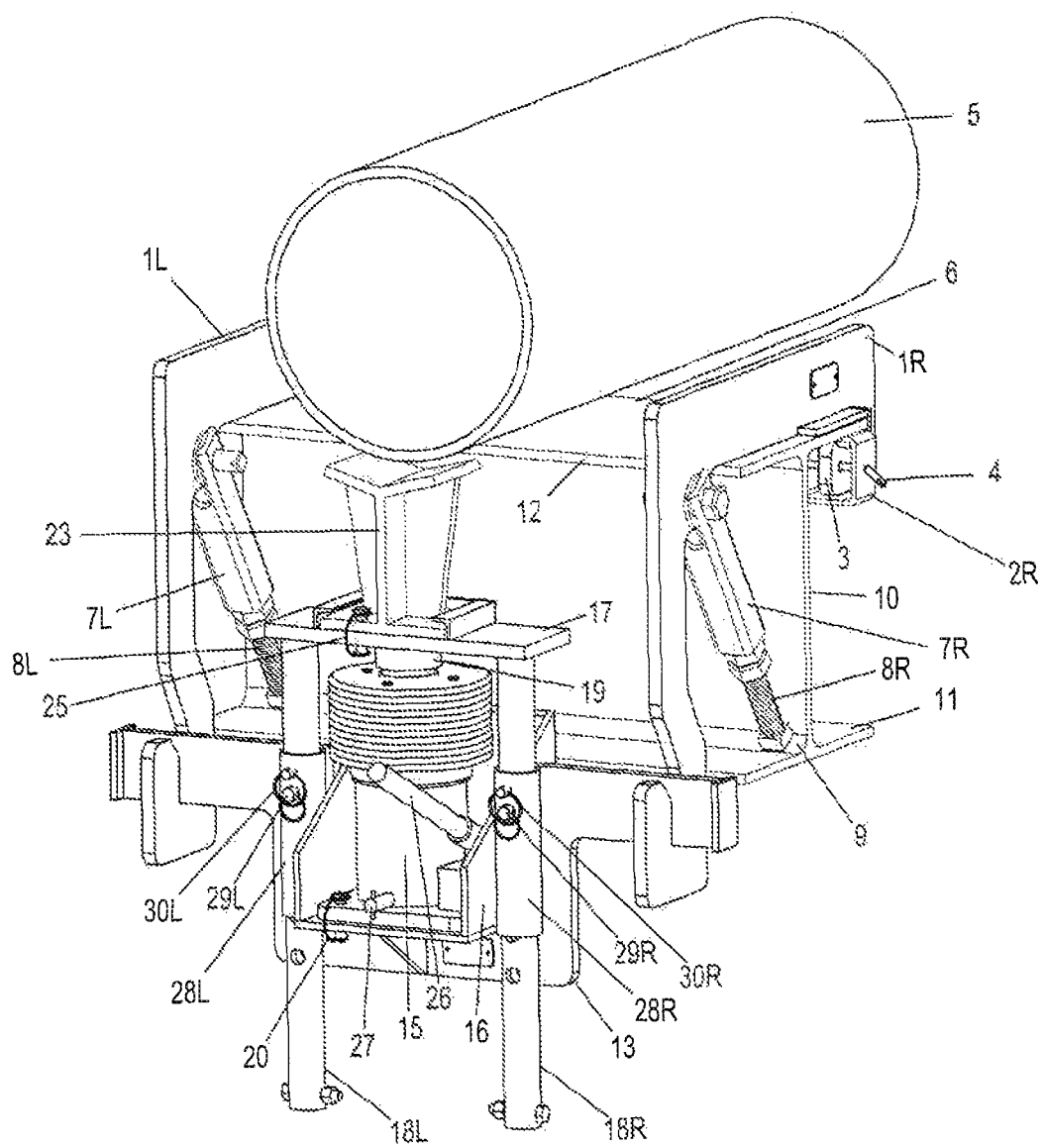
FIG. 1 is an isometric view of the present invention.
Figure 15:
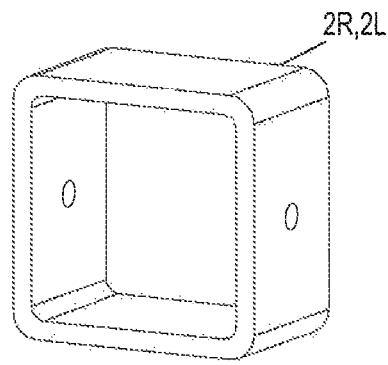
FIG. 15 is an isometric view of a box shim.
Figure 16:
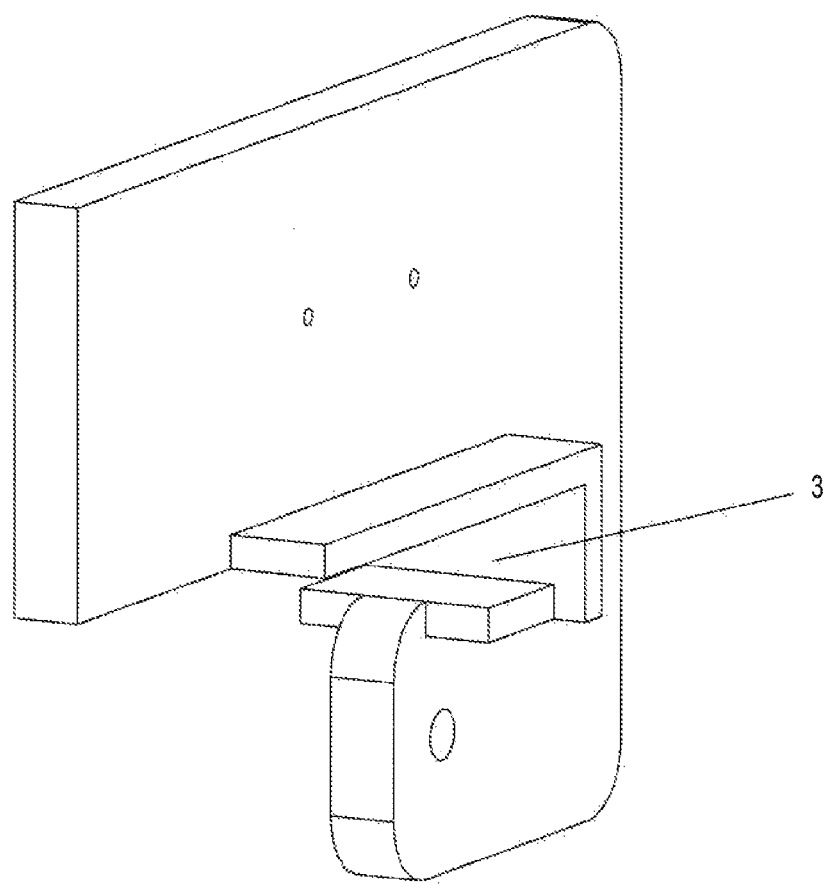
FIG. 16 is an isometric view of a portion of a support arm.
Figure 17:
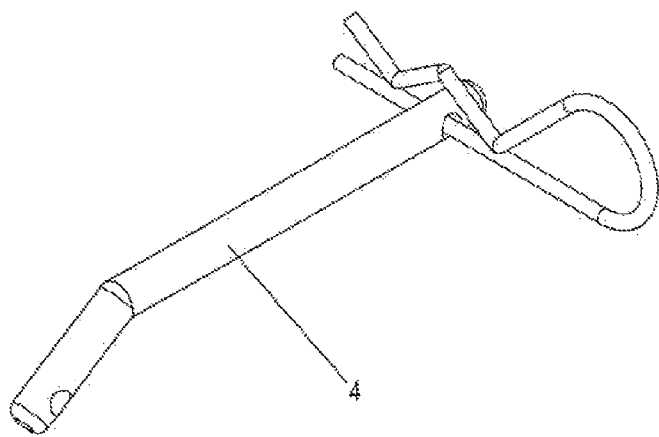
FIG. 17 is an isometric view of a shim retaining pin.

Next, check the thickness of the top flange 12 (FIGS. 1 & 4) of the pipe rack support beam 6 (FIGS. 1 & 4) for structural integrity. If top flange 12 is sound and is less than ½ inch thick, install a Box Shim 2 (FIGS. 1,3, & 15) on the Hook 3 (FIGS. 1,2, & 16) of each Support Arm 1R,1L (FIGS. 1 & 2) and secure in place with the Shim Retaining Pin 4 (FIG. 1, 3, 17). It should be noted that if beam flange 12 (FIGS. 1 & 4) is ½ inch thick or greater, the user should not use the Box Shims 2R, 2 (FIGS. 1, 3, & 15).

Figure 4:
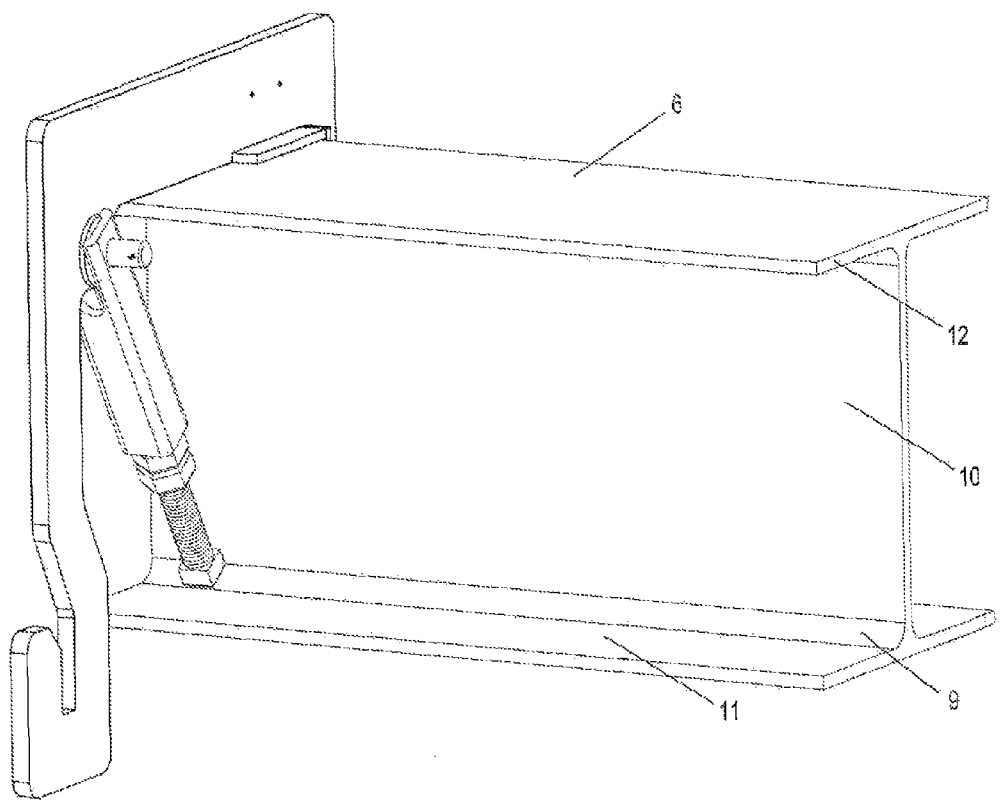
FIG. 4 is an isometric view of a support arm mounted on an I-beam.
Figure 5:
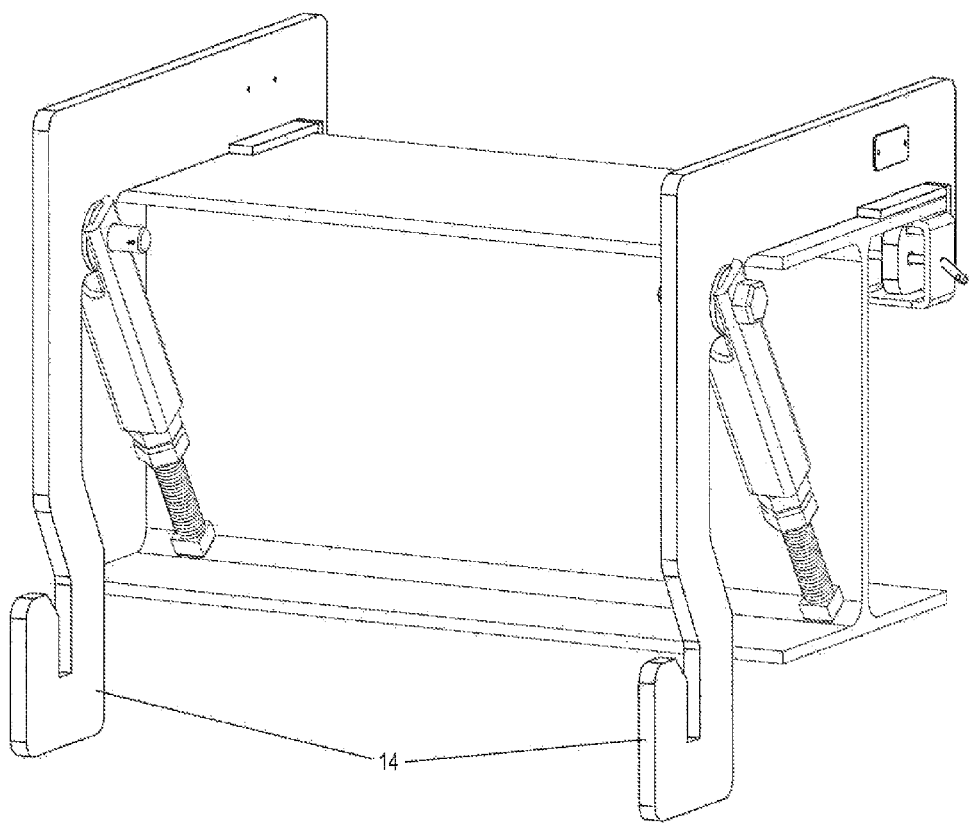
FIG. 5 is an isometric view of two support arms mounted on an I-beam.

At a point next to pipe 5 (FIGS. 1 & 9) to be lifted, place one Support Arm (FIGS. 1 & 2) across the top of the pipe rack support beam 6 (FIGS. 1 & 4) and pull forward to fully engage the Support Arm Hook 3 (FIGS. 1, 2, & 16) on the far side of the pipe rack support beam 6 (FIGS. 1 & 4). Swing the Pivoting Brace 7R (FIGS. 1 & 2) of the Support Arm 1R (FIGS. 1 & 2) up and seat the Adjustable Screw 8 (FIGS. 1 & 2) in the corner 9 (FIGS. 1 &4) formed by the beam web 10 (FIGS. 1 & 4) and the bottom flange 11 (FIGS. 1 & 4) of the pipe rack support beam 6 (FIGS. 1 & 4). Adjust the length of the Adjustable Screw 8R (FIGS. 1 & 2) as required to cause the Support Arm 1R (FIGS. 1 & 2) to rest flat across the top flange 12 (FIGS. 1 & 4) of the pipe rack support beam 6 (FIGS. 1 & 4).

Figure 2:
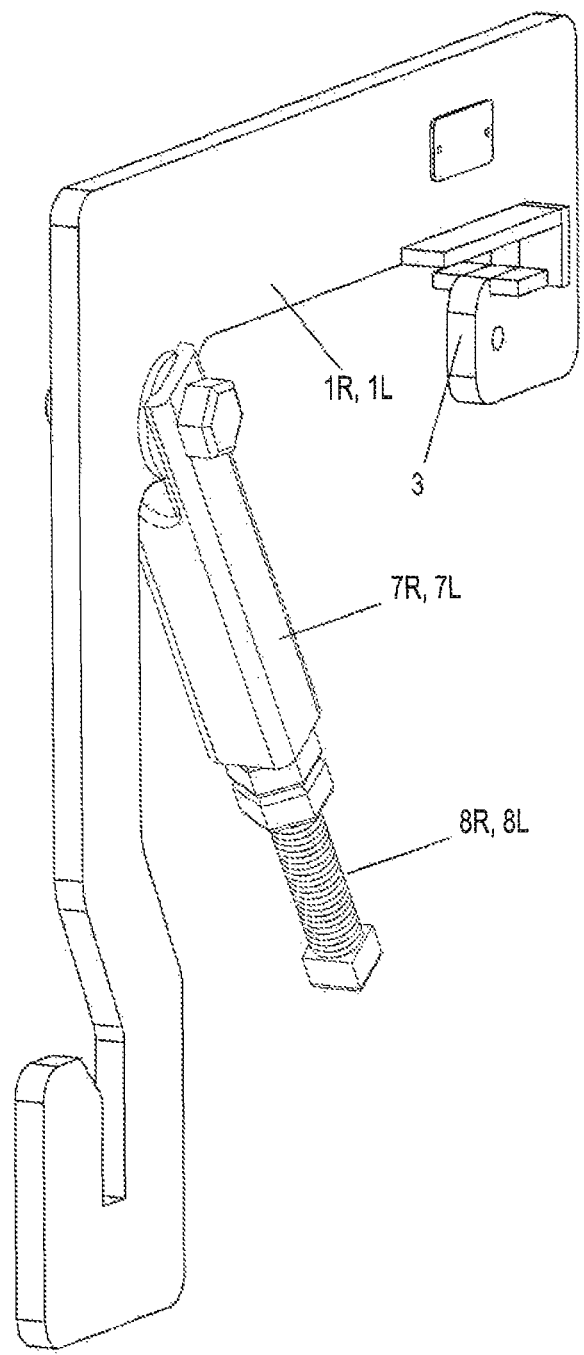
FIG. 2 is an isometric view of a support arm.
Figure 3:
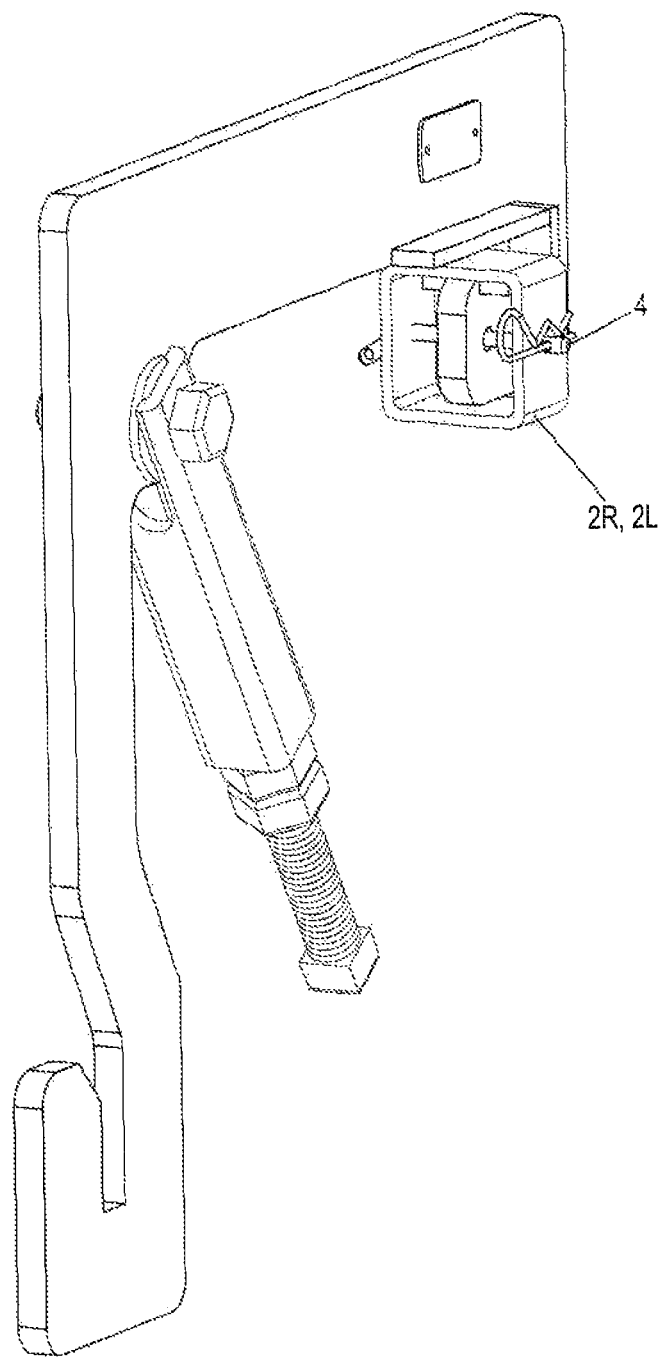
FIG. 3 is an isometric view of a support arm, showing a box shim.

Place the remaining Support Arm IL (FIGS. 1 & 2) across the top of the pipe rack support beam 6 (FIGS. 1 & 4) on the opposite side of pipe 5 (FIGS. 1 & 9) to be lifted, leaving at least 12½ inches between the two Support Arms 1R & 1L (FIGS. 1 & 2). Secure and adjust the Adjustable Screw 8L (FIGS. 1 & 2) as required to cause Support Arms 1L (FIGS. 1 & 2) to lie flat across top flange 12 (FIGS. 1&4) of the pipe rack support beam 6 (FIGS. 1 & 4).

Figure 6:
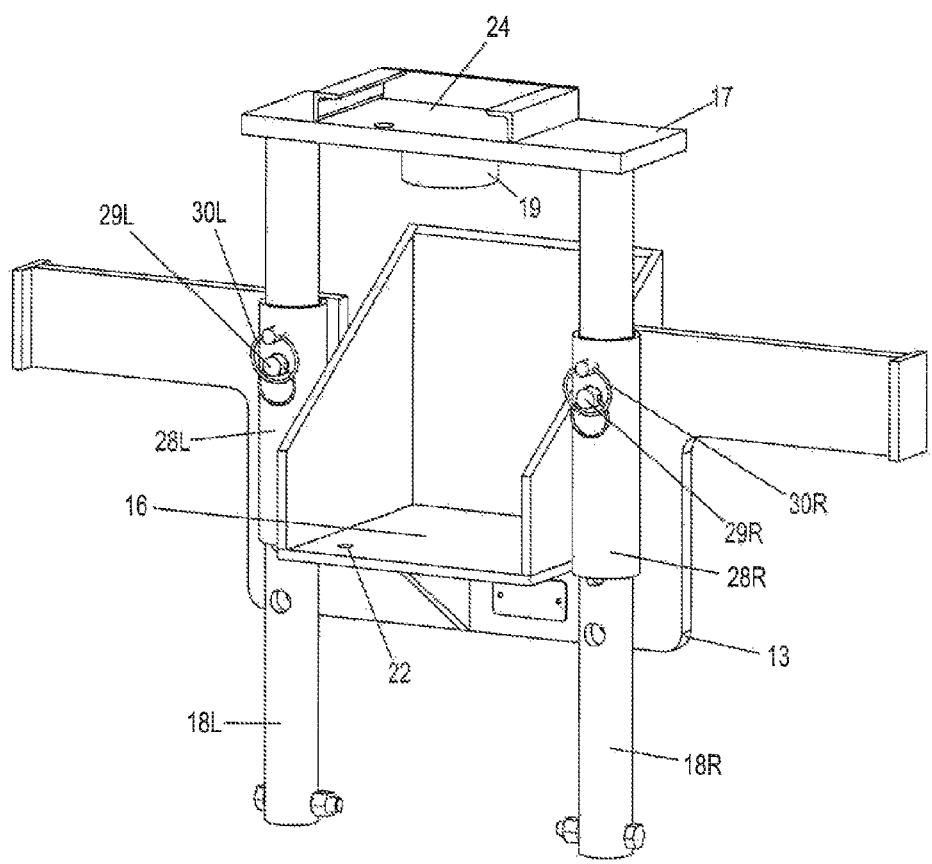
FIG. 6 is an isometric view of the lifting cradle/riser assembly.
Figure 7:
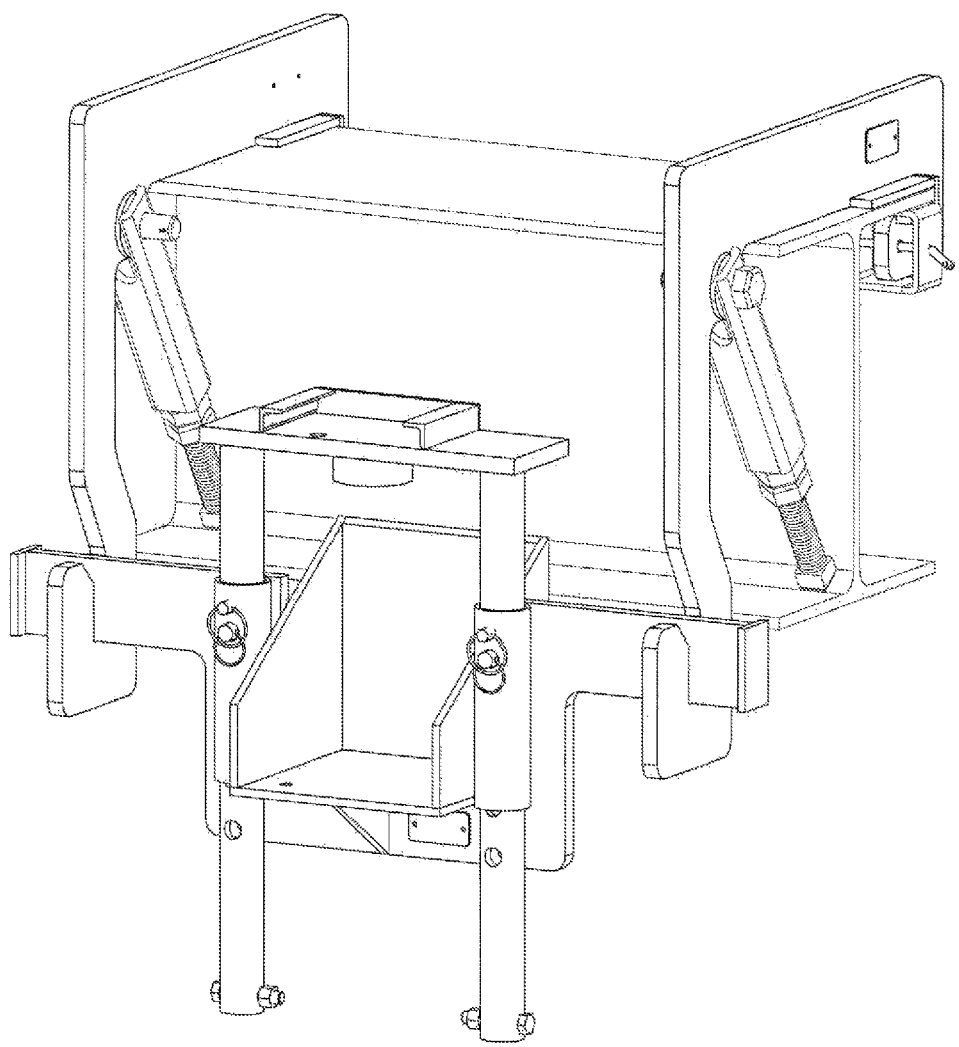
FIG. 7 is an isometric view of the lifting cradle/riser assembly mounted in two support arms.

Next, pick up the Lifting Cradle/Riser Assembly 13 (FIGS. 1 & 6) and hang it in the two Vertical Slots 14 (FIGS. 1 & 5) of the Support Arms 1R & 1L (FIGS. 1 & 2). Place the Hydraulic Jack 15 (FIGS. 1, 8, & 14) in the Lifting Cradle 16 (FIGS. 1 &6) and lift the Riser 17 (FIGS. 1 & 6) about two inches by pushing up on a Riser Pipe 18R or 18L (FIGS. 1 & 6) to allow the top of the Hydraulic Jack 15 (FIGS. 1, 8, & 14) to be fitted into the Jack Receiver Socket 19 (FIGS. 1 & 6) of the Riser 17 (FIGS. 1 &6).

Figure 8:
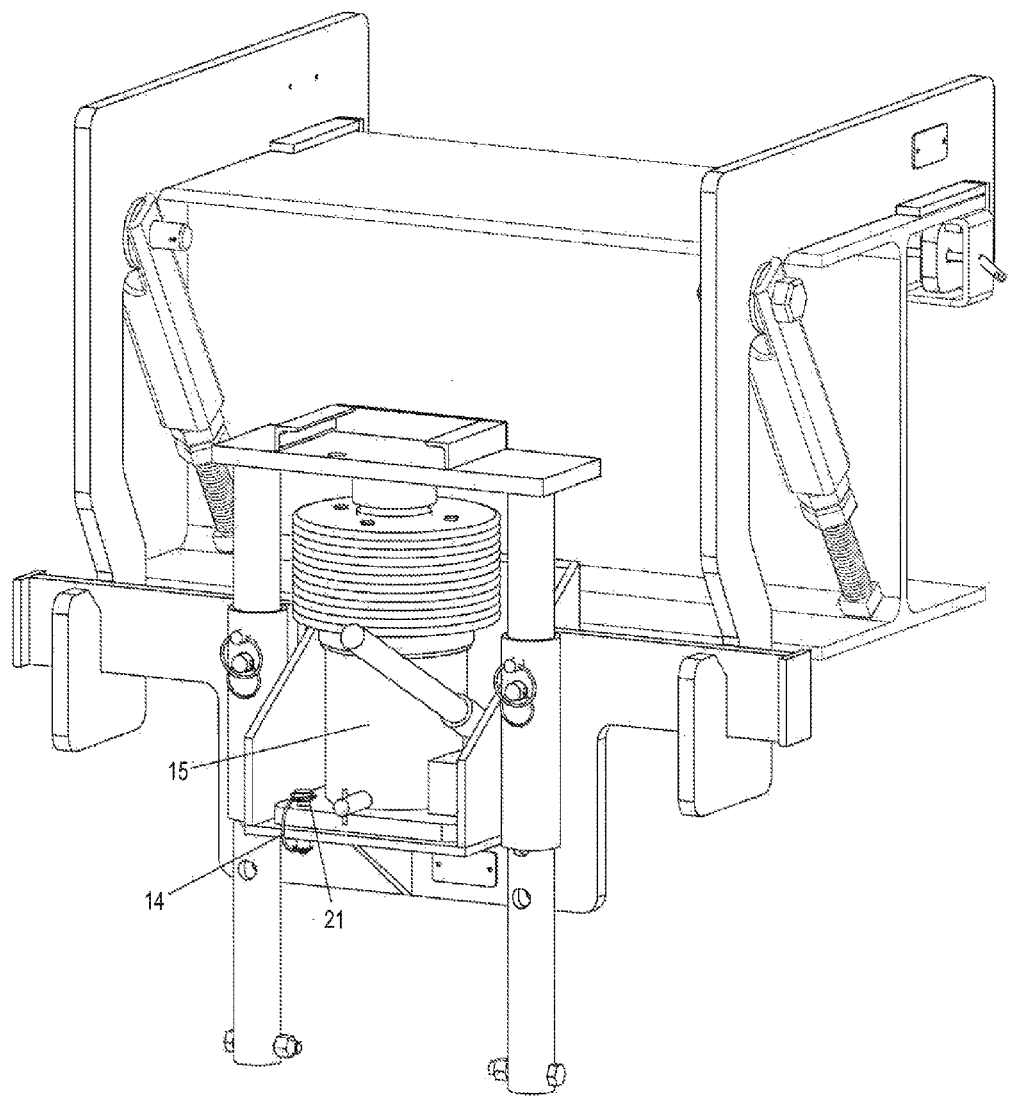
FIG. 8 is an isometric view of the present invention.
Figure 10:
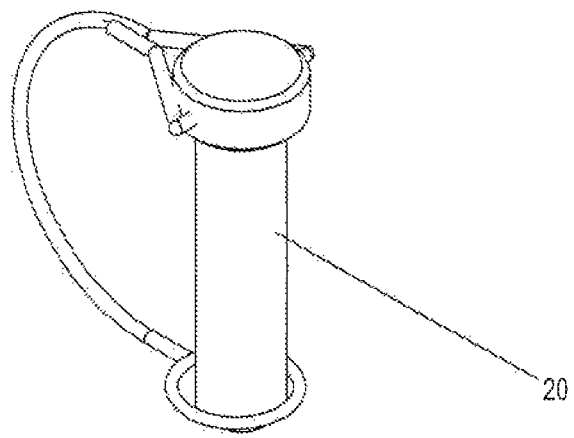
FIG. 10 is an isometric view of a jack retaining pin.

Next, insert the Jack Retaining Pin 20 (FIGS. 1, 8, & 10) through the hole 21 (FIG. 8) in the base of the Hydraulic Jack 15 (FIGS. 1, 8, & 14) and the matching hole 22 (FIG. 6) of the base of the Lifting Cradle 16 (FIGS. 1 & 6) and close the Jack Retaining Pin 20 (FIGS. 1, 8, & 10).

Figure 9:
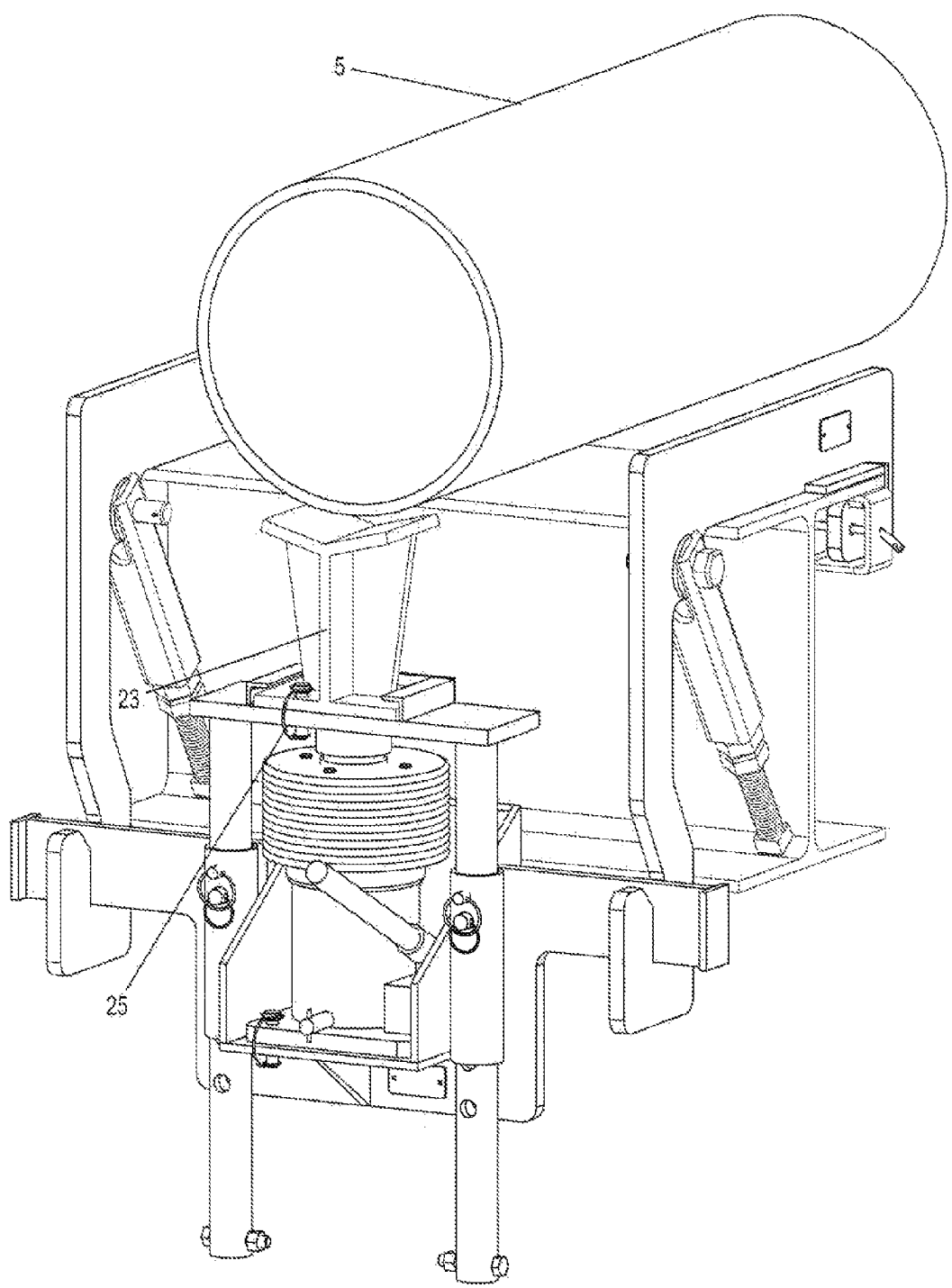
FIG. 9 is an isometric view of the present invention.
Figure 11:
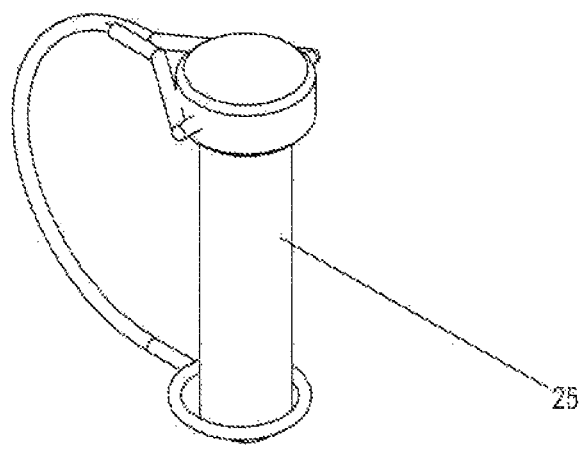
FIG. 11 is an isometric view of a vee retaining pin.
Figure 12:
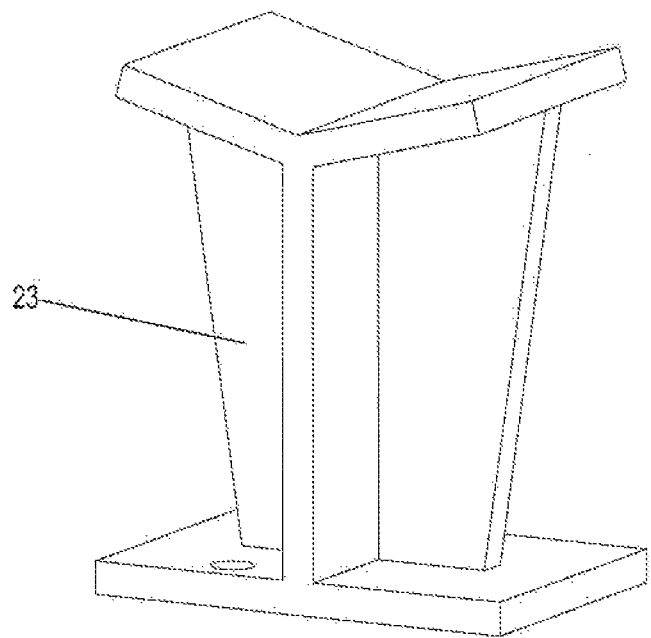
FIG. 12 is an isometric view of a vee for small diameter pipe.
Figure 13:
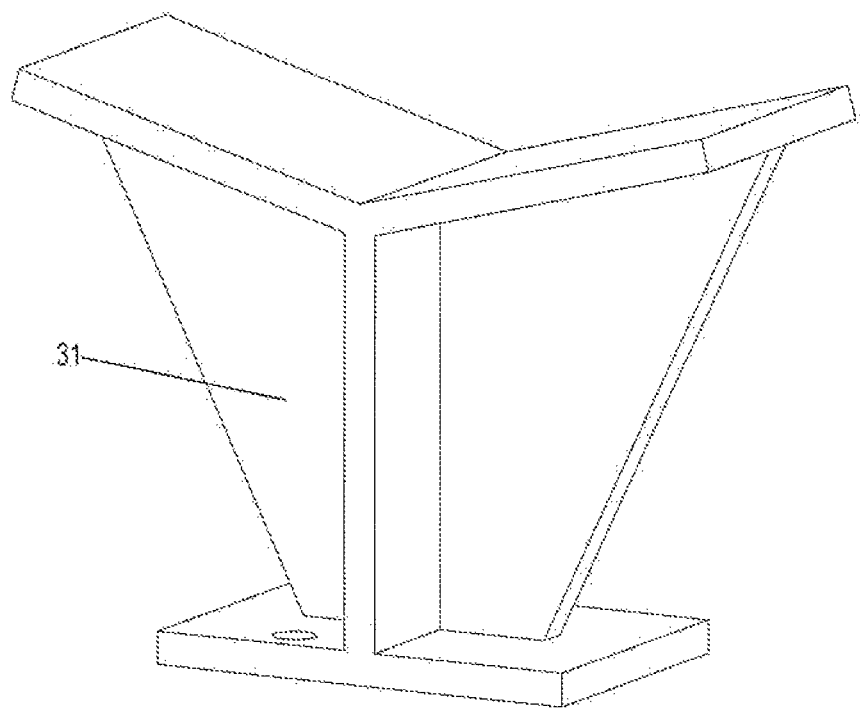
FIG. 13 is an isometric view of a vee for large diameter pipe.
Figure 14:
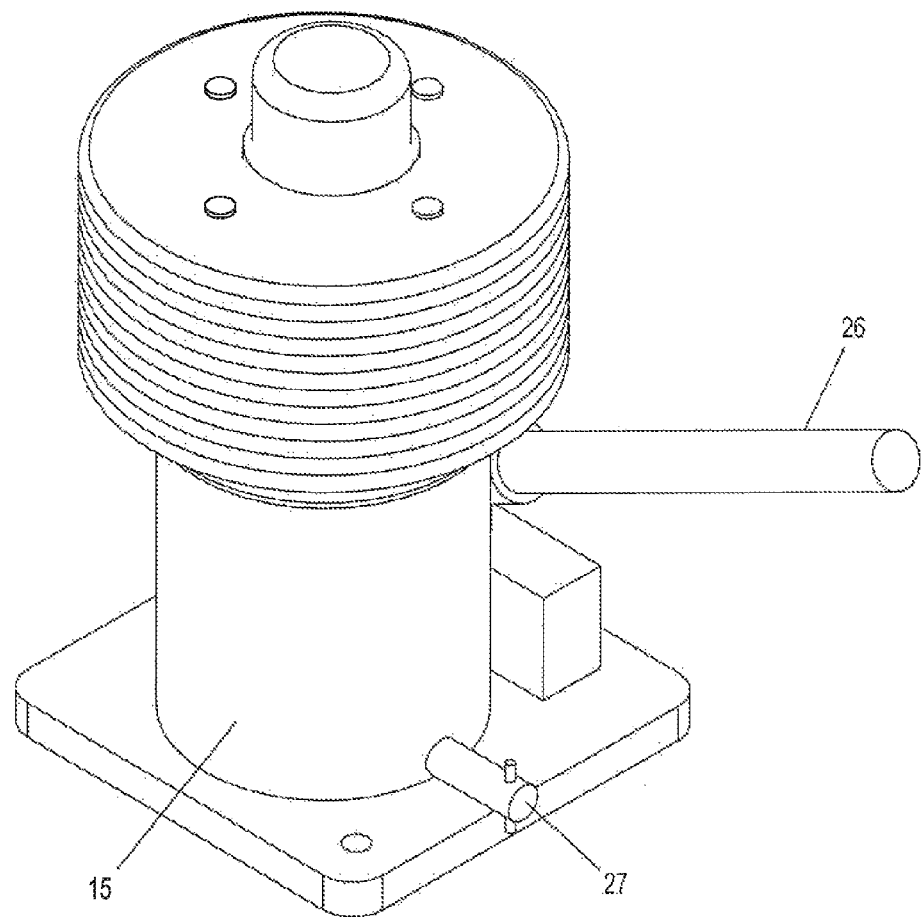
FIG. 14 is an isometric view of a jack.

If pipe 5 (FIGS. 1 & 9) is ten inches in diameter or smaller, slide the base of the small Vee 23 (FIGS. 1, 9, & 12) into the slot 24 (FIG. 6) at the top of the Riser (FIGS. 1 & 6) and secure with the Vee Retaining Pin 25 (FIGS. 1, 9, & 11). For a pipe (FIGS. 1 & 9) larger than 10", install the larger Vee 31 (FIG. 13) and secure with the Vee Retaining Pin 25 (FIGS. 1, 9, & 11).

Next, align the Lifting Cradle/Riser Assembly 13 (FIGS. 1 & 6) so that the center of Vee 23 (FIGS. 1, 9, & 12) or 31 (FIG. 13) (depending on which one is selected) is directly below the centerline of pipe 5 (FIGS. 1 & 9) to be lifted. With the slotted end of Jack handle 26 (FIGS. 1, 8, & 14), close the valve (FIGS. 1, 8 &14) at the base of Hydraulic Jack 15 (FIGS. 1, 8, & 14) and begin stroking Jack 15 (FIGS. 1, 8, & 14) until Vee 23 (FIGS. 1, 9, & 12) or 31 (FIG. 13) engages pipe 5 (FIGS. 1 & 9). Continue stroking Hydraulic Jack 15 (FIGS. 1, 8, & 14) until pipe 5 (FIGS. 1 & 9) is raised to the desired height above the pipe rack support beam 6 (FIGS. 1 & 4). Then, slightly adjust Hydraulic Jack 15 (FIGS. 1, 8, & 14) so that the holes in the Guide Sleeves 28R, 28L (FIGS. 1 & 6) of the Lifting Cradle 16 (FIGS. 1 & 6) align with a pair of holes in the Riser Pipes 18R, 18L of the Riser 17 (FIGS. 1 & 6). Lift the Guide Sleeve Spring Rings 30R, 30L (FIGS. 1 & 6) and insert the Shear Pins 29R, 29L (FIGS. 1, 6, & 18) through the Guide Sleeves 28R, 28L (FIGS. 1 & 6) and the one inch Riser Pipes 18R, 18L (FIGS. 1 & 6). Snap the Guide Sleeve Spring Rings 30R, 30L (FIGS. 1 & 6) down to keep the Shear Pins 29R, 29L (FIGS. 1, 6 & 18) in place. Both Shear Pins 29R, 29L (FIGS. 1, 6, & 18) MUST be inserted. This is a critical step and must be done to employ the fail-safe feature of the present invention.

Next, proceed with the inspection and maintenance of elevated pipe 5 (FIGS. 1 &9). When the desired inspection or maintenance activity on raised pipe 5 (FIGS. 1 & 9) has been completed, the present invention can be removed by following the steps described in the paragraphs below.

Figure 18:
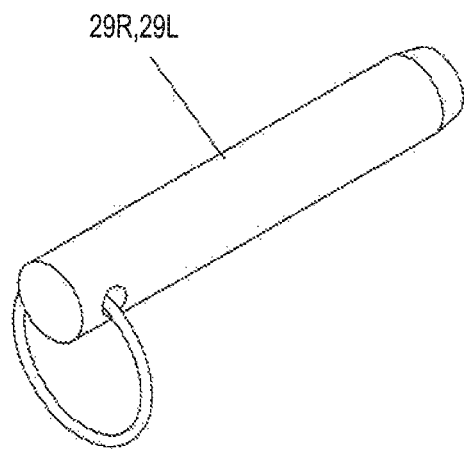
FIG. 18 is an isometric view of a shear pin.

Remove both Shear Pins 29R, 29L, (FIGS. 1,6, & 18) (It may be necessary to slightly adjust the position of the Hydraulic Jack 15 (FIGS. 1, 8, & 14) using the Jack Handle 26 (FIGS. 1, 8, & 14) and Jack Valve 27 (FIGS. 1, 8, &14) to release pressure on the Shear Pins 29R, 29L (FIGS. 1, 6, & 18). Using the slotted end of the Jack Handle 26 (FIGS. 1, 8, & 14), slowly turn Jack Valve 27 (FIGS. 1, 8, & 14) counterclockwise and allow raised pipe 5 (FIGS. 1 & 9) to return to rest on the Pipe Rack Support Beam 6 (FIGS. 1 & 4). Depress Hydraulic Jack 15 (FIGS. 1, 8, & 14) to minimum height by pulling down on the Riser 17 (FIGS. 1 & 6). Remove the Vee Retaining Pin 25 (FIGS. 1, 9, & 11) and slide the Vee 23 (FIGS. 1, 9, & 12) or 31 (FIG. 13) off the top of the Riser 17 (FIGS. 1 & 6) and set it aside. Remove the Jack Retaining Pin 20 (FIGS. 1, 8, & 10) that secures the Hydraulic Jack 15 (FIGS. 1, 8, & 14) to the Lifting Cradle 16 (FIGS. 1 & 6). Lift Riser 17 (FIGS. 1 & 6) about 2 inches, remove the Hydraulic Jack (FIGS. 1, 8, & 14) from the Lifting Cradle 16 (FIGS. 1 & 6) and place it on the work platform.

Slide the Lifting Cradle/Riser Assembly 13 (FIGS. 1 & 6) up and out of the vertical slots 14 (FIGS. 1, 2, & 5) of the Support Arms 1R, 1L (FIGS. 1 & 2) and place it on the working platform. Remove both Support Arms 1R, 1L (FIGS. 1 & 2) and place on the working platform. The present invention is now ready to be moved to the next location.

For situations where pipe 5 (FIGS. 1 & 9) rests on a square tube support beam 32 (FIG. 19), a pair of Beam Adapters 33 (FIGS. 19 & 20)) must be installed, as discussed in more detail below.

First, the user should identify the size of the square tube support beam 32 (FIG. 19) (typically 4", 6", 8", 10"). Then the user should select a Beam Adapter 33 (FIGS. 19 & 20) that corresponds to the size of the square tube support beam 32 (FIG. 19).

Holding the Beam Adapter 33 (FIGS. 19 & 20) such that the Guide Channel 34 (FIG. 19) is located at the top of the Beam Adapter 33 (FIGS. 19 & 20), remove the Latch Pin 35 (FIG. 19) and allow the Swing Arm 36 (FIGS. 19 & 20) to hang vertically. Lift the Beam Adapter 33 (FIGS. 19 & 20) above the square tube support beam 32 (FIG. 19) and, at a point alongside pipe 5 (FIGS. 1 & 9), lower the Beam Adapter 33 (FIGS. 19 & 20) so that Seating Arm 37 (FIGS. 19 & 20) and Hinge Arm 38 (FIGS. 19 & 20) fit snugly against the sides of the square tube support beam 32 (FIG. 19). Rotate Swing Arm 36 (FIGS. 19 & 20) upward until the hole 39 (FIG. 20) of the Swing Arm 36 (FIGS. 19 & 20) is in line with the holes 40 (FIG. 20) of the Seating Arm 37 (FIGS. 19 & 20).

Insert Latch Pin 35 (FIG. 19) through hole 39 (FIG. 20) and hole 40 (FIG. 20) to secure the Swing Arm 36 (FIGS. 19 & 20) in a horizontal position. On the opposite side of pipe 5 (FIGS. 1 & 9), install a second Beam Adapter 33 (FIGS. 19 & 20) as described above. Note that the Seating Aim 37 (FIGS. 19 & 20) of each Beam Adapter 33 (FIGS. 19 & 20) must be on the same side of the square tube support beam 32 (FIG. 19). The square tube support beam 32 (FIG. 19) is now prepared to receive Support Arms 1R, 1L (FIGS. 1 & 2).

Figure 19:
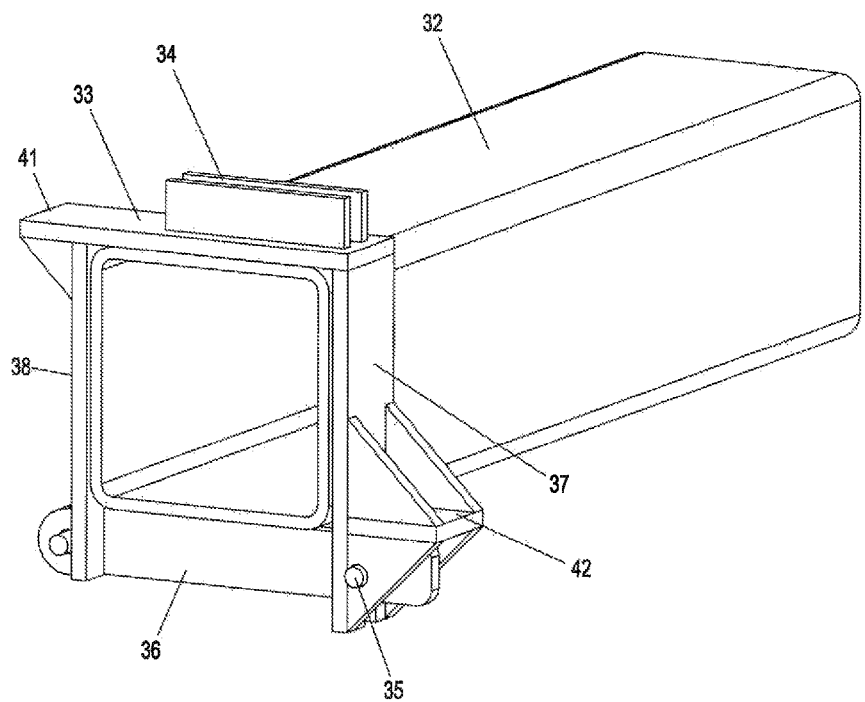
FIG. 19 is an isometric view of a beam adapter.
Figure 20:
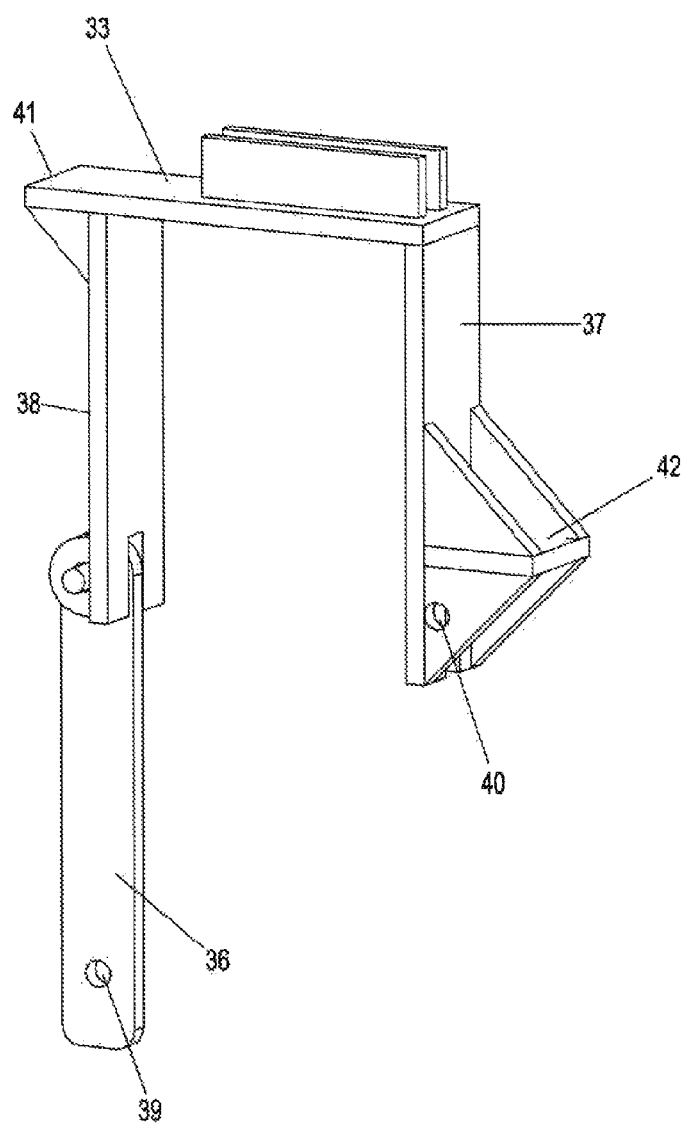
FIG. 20 is an isometric view of a beam adapter.

Place one Support Arm 1R or 1L (FIGS. 1 & 2) in the Channel 34 (FIG. 19) of one Beam Adapter 33 (FIGS. 19 & 20) and pull back so that the Hook 3 (FIGS. 1, 2, & 16) engages the Flange 41 (FIGS. 19 & 20) of the Beam Adapter 33 (FIGS. 19 & 20). Lift Support Arm 1R or 1L (FIGS. 1 & 2) and swing Adjustable Screw 8R or 8L (FIGS. 1& 2) up to place it in the Seating Arm Socket 42 (FIGS. 19 & 20). Repeat this step for the remaining Support Arm 1R or 1L (FIGS. 1 & 2).

The Lifting Cradle/Riser Assembly 13 (FIGS. 1 & 6) can now be placed in the Support Arms 1R, 1L (FIGS. 1 & 2) as described above.

What is claimed is:

1. An apparatus for lifting pipe, said apparatus comprising:
   (a) a left support arm for placing to the left of a pipe to be lifted, said left support arm having a vertical slot and a hook;
   (b) a left pivoting brace rotatably attached at one end to said left support arm; said left pivoting brace having an adjustable screw extending from an end opposite said end attached to said left support arm;
   (c) a right support arm for placing to the right of said pipe to be lifted, said right support arm having a vertical slot and a hook;
   (d) a right pivoting brace rotatably attached at one end to said right support arm, said right pivoting brace having an adjustable screw extending from an end opposite said end attached to said right support arm;

(e) a lifting cradle/riser assembly slidably supported in said vertical slot of said left support arm and said vertical slot of said right support arm; said lifting cradle/riser assembly having a lifting cradle, a riser, and a jack receiver socket;

(f) a jack removably positioned in said lifting cradle; and (g) a vee removably placed on top of said riser.

2. The apparatus of claim 1, further comprising a left box shim removably attached to said hook of said left support arm, and a right box shim removably attached to said hook of said right support arm.

3. The apparatus of claim 2, where said jack has a top that fits into said jack receiver socket.

4. The apparatus of claim 3, further comprising a jack retaining pin for securing said jack in said lifting cradle.

5. The apparatus of claim 4, where said lifting cradle/riser assembly is equipped with a left guide sleeve and a right guide sleeve.

6. The apparatus of claim 5, further comprising a left riser pipe attached to said riser and slidably inserted into said left guide sleeve, and a right riser pipe attached to said riser and slidably inserted into said right guide sleeve.

7. The apparatus of claim 6, where said left guide sleeve has a hole extending through said left guide sleeve, and said right guide sleeve has a hole extending through said right guide sleeve.

8. The apparatus of claim 7, where said left riser pipe has at least one hole extending through said left riser pipe for aligning with said hole extending through said left guide sleeve.

9. The apparatus of claim 8, where said right riser pipe has at least one hole extending through said right riser pipe for aligning with said hole extending through said right guide sleeve.

10. The apparatus of claim 9, further comprising a left shear pin for inserting through said hole extending through said left guide sleeve when aligned with said at least one hole extending through said left riser pipe, and a right shear pin for inserting through said hole extending through said right guide sleeve when aligned with said at least one hole extending through said right riser pipe.

11. An apparatus for lifting pipe, said apparatus comprising:

(a) a left beam adaptor for placing to the left of a pipe to be lifted, said left beam adaptor having a guide channel;

(b) a left support arm removably positioned in said guide channel of said left beam adaptor, said left support arm having a vertical slot and a hook;

(c) a left pivoting brace rotatably attached at one end to said left support arm; said left pivoting brace having an adjustable screw extending from an end opposite said end attached to said left support arm;

(d) a right beam adaptor for placing to the right of a pipe to be lifted, said right beam adaptor having a guide channel;

(e) a right support arm removably positioned in said guide channel of said right beam adaptor, said right support arm having a vertical slot and a hook;

(f) a right pivoting brace rotatably attached at one end to said right support arm, said right pivoting brace having an adjustable screw extending from an end opposite said end attached to said right support arm;

(g) a lifting cradle/riser assembly slidably supported in said vertical slot of said left support arm and said vertical slot of said right support arm; said lifting cradle/riser assembly having a lifting cradle, a riser, and a jack receiver socket;

(h) a jack removably positioned in said lifting cradle; and (i) a vee removably placed on top of said riser.

12. The apparatus of claim 11, where said jack has a top that fits into said jack receiver socket.

13. The apparatus of claim 12, further comprising a jack retaining pin for securing said jack in said lifting cradle.

14. The apparatus of claim 13, where said lifting cradle/riser assembly is equipped with a left guide sleeve and a right guide sleeve.

15. The apparatus of claim 14, further comprising a left riser pipe attached to said riser and slidably inserted into said left guide sleeve, and a right riser pipe attached to said riser and slidably inserted into said right guide sleeve.

16. The apparatus of claim 15, where said left guide sleeve has a hole extending through said left guide sleeve, and said right guide sleeve has a hole extending through said right guide sleeve.

17. The apparatus of claim 16, where said left riser pipe has at least one hole extending through said left riser pipe for aligning with said hole extending through said left guide sleeve.

18. The apparatus of claim 17, where said right riser pipe has at least one hole extending through said right riser pipe for aligning with said hole extending through said right guide sleeve.

19. The apparatus of claim 18, further comprising a left shear pin for inserting through said hole extending through said left guide sleeve when aligned with said at least one hole extending through said left riser pipe.

20. The apparatus of claim 19, further comprising a right shear pin for inserting through said hole extending through said right guide sleeve when aligned with said at least one hole extending through said right riser pipe.

* * * * *